(12) United States Patent
Koehn

(10) Patent No.: US 6,648,136 B2
(45) Date of Patent: Nov. 18, 2003

(54) BOOK INSERT COMPACT DISC CARRIER DEVICE

(75) Inventor: Annalee Koehn, Chicago, IL (US)

(73) Assignee: R. R. Donnelley & Sons Company, Chicago, IL (US)

( * ) Notice: Subject to any disclaimer, the term of this patent is extended or adjusted under 35 U.S.C. 154(b) by 90 days.

(21) Appl. No.: 09/965,612

(22) Filed: Sep. 27, 2001

(65) Prior Publication Data

US 2002/0089165 A1 Jul. 11, 2002

Related U.S. Application Data

(60) Provisional application No. 60/260,576, filed on Jan. 8, 2001.

(51) Int. Cl.$^7$ .............................................. B65D 85/57
(52) U.S. Cl. ..................................... 206/308.1; 206/312
(58) Field of Search ............................... 206/232, 308.1, 206/309–313, 449, 454, 459.5, 455; 229/72, 75

(56) References Cited

U.S. PATENT DOCUMENTS

| | | | | |
|---|---|---|---|---|
| 4,620,630 A | * | 11/1986 | Moss | 206/45.24 |
| 5,333,728 A | * | 8/1994 | O'Brien et al. | 206/232 |
| 5,638,953 A | * | 6/1997 | House | 26/308.1 |
| 5,697,496 A | * | 12/1997 | Bauer | 206/308.1 |
| 5,857,565 A | * | 1/1999 | Baker et al. | 206/232 |
| 6,032,795 A | * | 3/2000 | Ehrlund et al. | 206/312 |
| 6,068,117 A | * | 5/2000 | Koehn | 206/232 |
| 6,092,653 A | * | 7/2000 | Pozzoli | 206/312 |
| 6,126,201 A | * | 10/2000 | Pace et al. | 281/29 |
| 6,296,112 B1 | * | 10/2001 | Pettey | 206/232 |

OTHER PUBLICATIONS

Fig. 1 illustrating prior art book insert device.
Figs. 2 and 3 illustrating prior art book insert device.

* cited by examiner

*Primary Examiner*—Shian Luong
(74) *Attorney, Agent, or Firm*—Marshall, Gerstein & Borun LLP

(57) ABSTRACT

A CD carrier is disclosed and comprises a single paperboard sheet having a plurality of hinge lines dividing the sheet into a plurality of panels, with each of the panels having first and second faces corresponding to first and second faces of the sheet. The CD carrier further comprises a first panel and a second panel which fold to form a pocket sized to receive a CD. Third, fourth and fifth panels are provided. A tear away strip is defined in part by cooperating frangible connections on each of the third and fourth panels. The CD carrier is formed by folding the first panel along a first hinge line to create the pocket, folding the fifth panel along a fourth hinge line thereby positioning the second face of the first panel side by side with the second face of the fifth panel, folding the first and second panels together along a second hinge line until the second face of the first panel is in confronting relationship with the second face of the fifth panel, and then folding the fourth panel along a the third hinge line so that an overlapping edge portion of the fourth panel overlaps the second panel but is unsecured to the second panel. Cooperating portions of the fourth panel and the second panel form a binding face adapted to permit adhesive securement of the CD carrier to the book.

31 Claims, 9 Drawing Sheets

BOOK INSERT COMPACT DISC CARRIER DEVICE

RELATED APPLICATIONS

This application claims the benefit of earlier provisional application Ser. No. 60/260,576, filed Jan. 8, 2001.

FIELD OF THE INVENTION

The present invention generally relates to a book insert and, more particularly, to a book insert having one or more pockets for carrying compact discs.

BACKGROUND OF THE INVENTION

In recent years, it has become desirable to market books and an additional media, such as, for example, audio cassette tapes, computer diskettes, digital video discs, and compact discs, as a single unit. By marrying the technology of sound recordings or computer files with the printed text of books, the entertainment and/or informational value of the books is greatly enhanced, thereby increasing the marketability of such books.

More specifically, the surge in popularity of compact audio and video discs (hereinafter collectively "CDs"), combined with the small size of CDs has made the sale of books together with CDs particularly attractive. To enable the successful marketing of a combination book and CD product, a carrier device for packaging the books and CDs as a single unit is desirable. Presently, a number of devices are available for packaging CDs or similarly shaped media with books or the like.

By way of example, Uchida U.S. Pat. No. 5,224,599, discloses a container for holding a floppy disc that has a double-sided adhesive strip on a back panel of the container for securing the container to the inside of a binder. Pace et al. U.S. Pat. No. 5,713,605 discloses a folder for binding and mailing CDs. Stevens U.S. Pat. No. 5,590,912 discloses a personalized envelope assembly for a disc that can be bound into the interior of a printed publication.

In addition to patents directed to the unitary packaging of CD-like media with books, several patents are directed to techniques for packaging a CD individually or in combination with other CDs. For example, Bauer U.S. Pat. No. 5,697,496 discloses a package for a compact disk or computer diskette that includes a corrugated board inset attached to a panel of a die-cut sleeve. Manning U.S. Pat. No. 4,793,477 discloses a storage container having the overall appearance of a conventional book but which actually includes an interior cavity having pockets for holding CDs or audio cassettes. Lastly, Pettey U.S. Pat. No. 5,669,491 is directed to a CD folder having the form of a booklet with a front and back cover, and having a pocket for holding CDs attached to the interior of the front cover.

Thus, it is desirable to provide a carrier device which enables the packaging of one or more CDs with a book as a single unit. It is desirable that such a carrier device be light-weight, inexpensive and detachably secured to the book without adding bulk and without increasing the dimensional size of the book. Moreover, it is desirable that the carrier device be easily manufactured and be usable as a storage unit for the CD while the CD is not in use.

SUMMARY OF THE INVENTION

In accordance with a first aspect of the invention, a CD carrier for insertion into a book comprises a single paperboard sheet having a first face and a second face, and includes a plurality of hinge lines dividing the sheet into a plurality of panels, with each of the panels having first and second faces corresponding to the first and second faces of the sheet. The CD carrier further comprises a first panel and a second panel are separated by a first hinge line, with the first panel being foldable along the first hinge line to a folded position adjacent the second panel to form a pocket therebetween. The pocket is sized to receive a CD therein. A third panel is provided which is separated from the second panel by a second hinge line, and a fourth panel is provided which is separated from the third panel by a third hinge line, the first, second and third hinge lines being generally parallel to each other. A fifth panel is provided which is separated from the third panel by a fourth hinge line, with the fourth hinge line being perpendicular to the first, second and third hinge lines. A tear away strip is provided, with the tear away strip defined in part by cooperating frangible connections on each of the third and fourth panels. The CD carrier is formed by folding the first panel along the first hinge line to create the pocket, folding the fifth panel along the fourth hinge line thereby positioning the second face of the first panel side by side with the second face of the fifth panel, folding the first and second panels together along the second hinge line until the second face of the first panel is in confronting relationship with the second face of the fifth panel, and then folding the fourth panel along the third hinge line so that an overlapping edge portion of the fourth panel overlaps the second panel but is unsecured to the second panel. Cooperating portions of the fourth panel and the second panel form a binding face adapted to permit adhesive securement of the CD carrier to the book.

In further accordance with a preferred embodiment, the fourth panel may be sized so that the overlapping edge portion extends at least twenty five percent across a width of the second panel. The frangible connection of the fourth panel divides the fourth panel into a fixable section and a removable section, with the fixable section forming a portion of the binding face, and with the fixable section being at least as wide as the removable section. The CD may be combined with a book, with the book including a CD carrier receiving area. The binding face is adhesively secured to the CD carrier receiving area, and upon removal of the tear away strip the CD carrier is openable in book form along the second hinge line.

Preferably, at least one of the first panel and the second panel includes a pair of tabs, with each of the tabs being foldable along a tab hinge line to a folded position. Each of the tabs includes an adhesion surface to permit adhesive securement of the first panel to the second panel when the first and second panels are in the folded position.

Still preferably, the second face of each of the panels is adapted to receive printed matter thereon. The first panel includes a side edge, with the side edge preferably including a cutout extending from the side edge of the first panel toward the center of the first panel. The cutout is sized to reveal a pie-shaped portion of a CD disposed in the pocket, the pie-shaped portion extending about to a central aperture of the CD. A divider may be provided in order to divide the pocket into a pair of compartments. Preferably, the divider comprises an adhesive strip extending generally across a width of at least one of the first and second panels.

Other features and advantages will become readily apparent to those of skill in the art upon reading the following detailed description in conjunction with the accompanying drawings.

DETAILED DESCRIPTION OF THE PREFERRED EMBODIMENT

Figure 1:
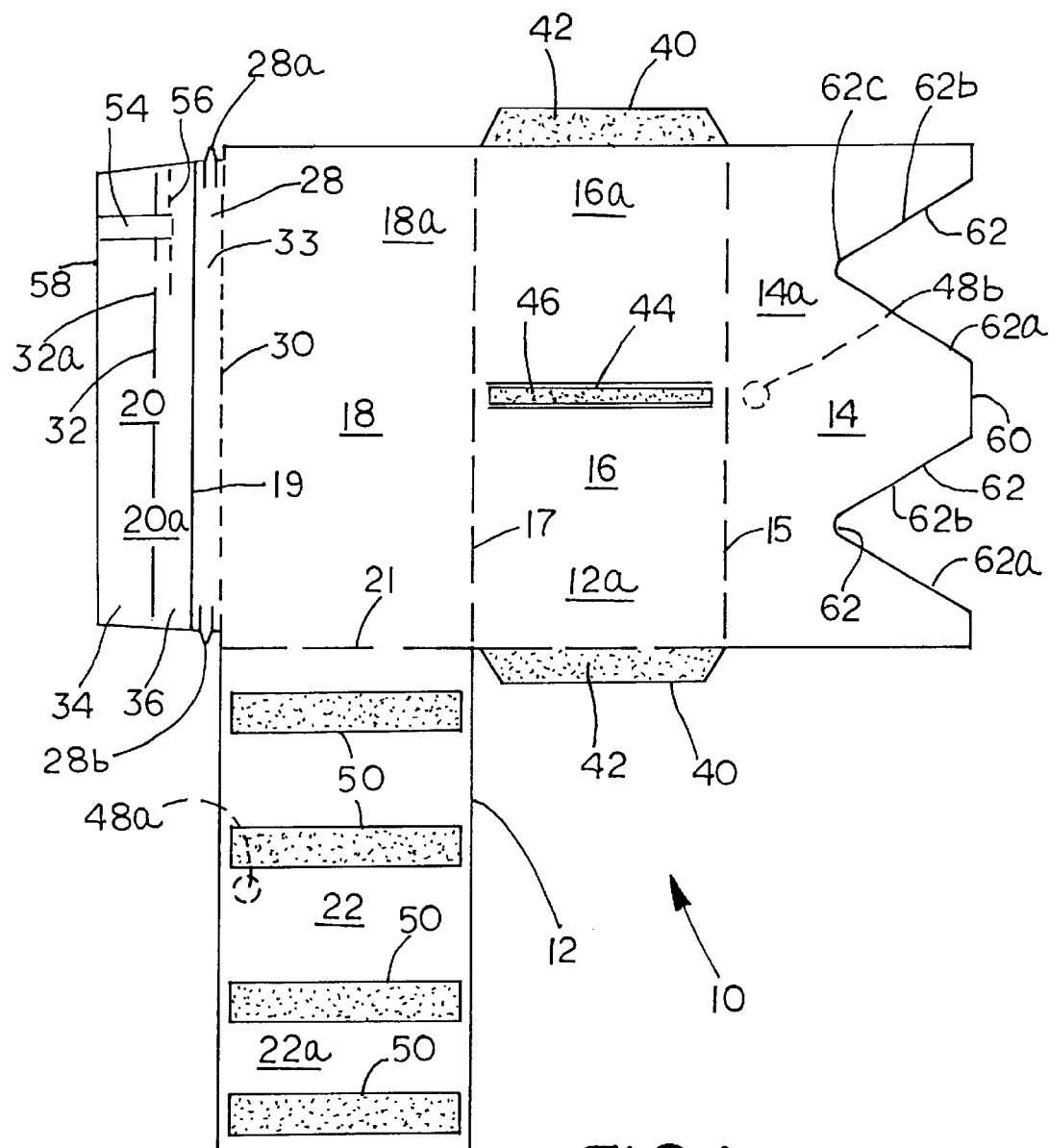
FIG. 1 is a top plan view of an unassembled book insert CD carrier device constructed in accordance with the teachings of a first preferred embodiment of the present invention and showing the un-printed side (i.e., the non-glossy side) exposed.

The following description of the preferred embodiment is not intended to limit the scope of the invention to the precise form or forms disclosed, but instead is intended to be illustrative of the principles of the invention so that others skilled in the art may follow its teachings.

Referring now to the drawings, a book insert CD carrier device assembled in accordance with the teachings of a preferred embodiment of the invention is designated by the reference numeral 10. The CD carrier device 10 includes a single paper board sheet 12 having two opposing surfaces, one of which is non-glossy surface 12a (see FIG. 1) and the other which is a glossy surface 12b (see FIG. 2). The sheet 12, which is preferably a stock of 12 point sheet board stock (12 pt SBS) is partitioned into a plurality of panels that are divided from one another by a plurality of hinge lines as will be described in greater detail below.

As will be described in greater detail below, the various panels are foldable about the appropriate hinge lines and secured as necessary to form the carrier device 10. The carrier device 10 may be subsequently attached to a receiving area 11 inside a book 13. In the embodiment shown, the receiving area 11 is defined by a portion of a rear cover 13a of the book 13. Of course, it will be understood that the carrier device 10 may also be attached to a front cover 13b of the book 13. Further, the carrier device 10 may be attached to either an interior surface or and exterior surface of the rear cover 13a or the front cover 13b of the book 13.

The carrier device 10 includes five panels 14, 16, 18, 20 and 22. A first hinge line 15 separates the panels 14 and 16, a second hinge line 17 separates the panels 16 and 18, a third hinge line 19 separates the panels 18 and 20, and a fourth hinge line 21 separates the panels 18 and 22. The shape of the paperboard sheet 12 may be formed using conventional techniques, and the hinge lines 15, 17, 19 and 21 may be formed using conventional techniques.

Figure 2:
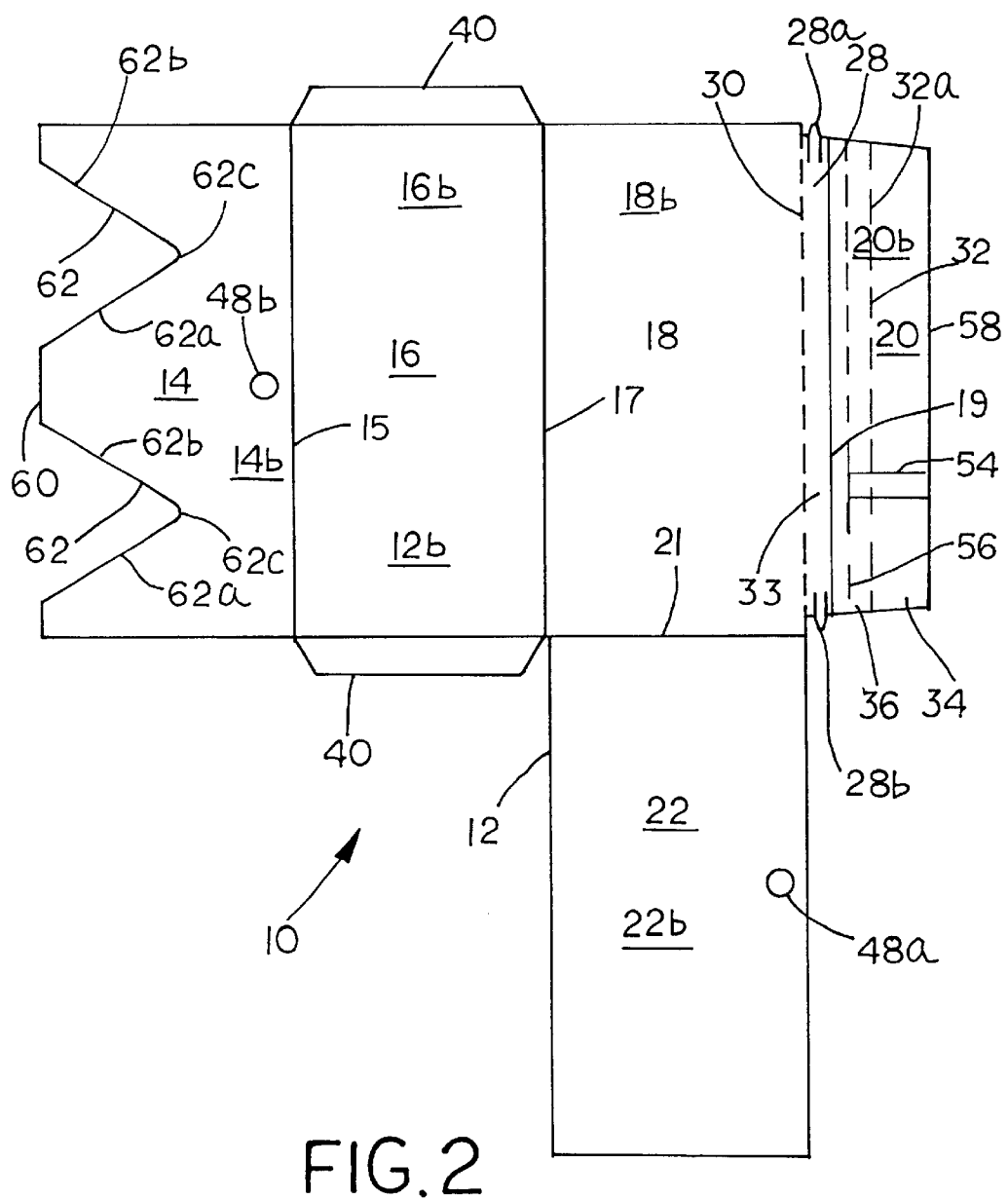
FIG. 2 is a bottom plan view of the unassembled book insert CD carrier device of FIG. 1 shown with the printable side (i.e., the glossy side) exposed.
Figure 3:
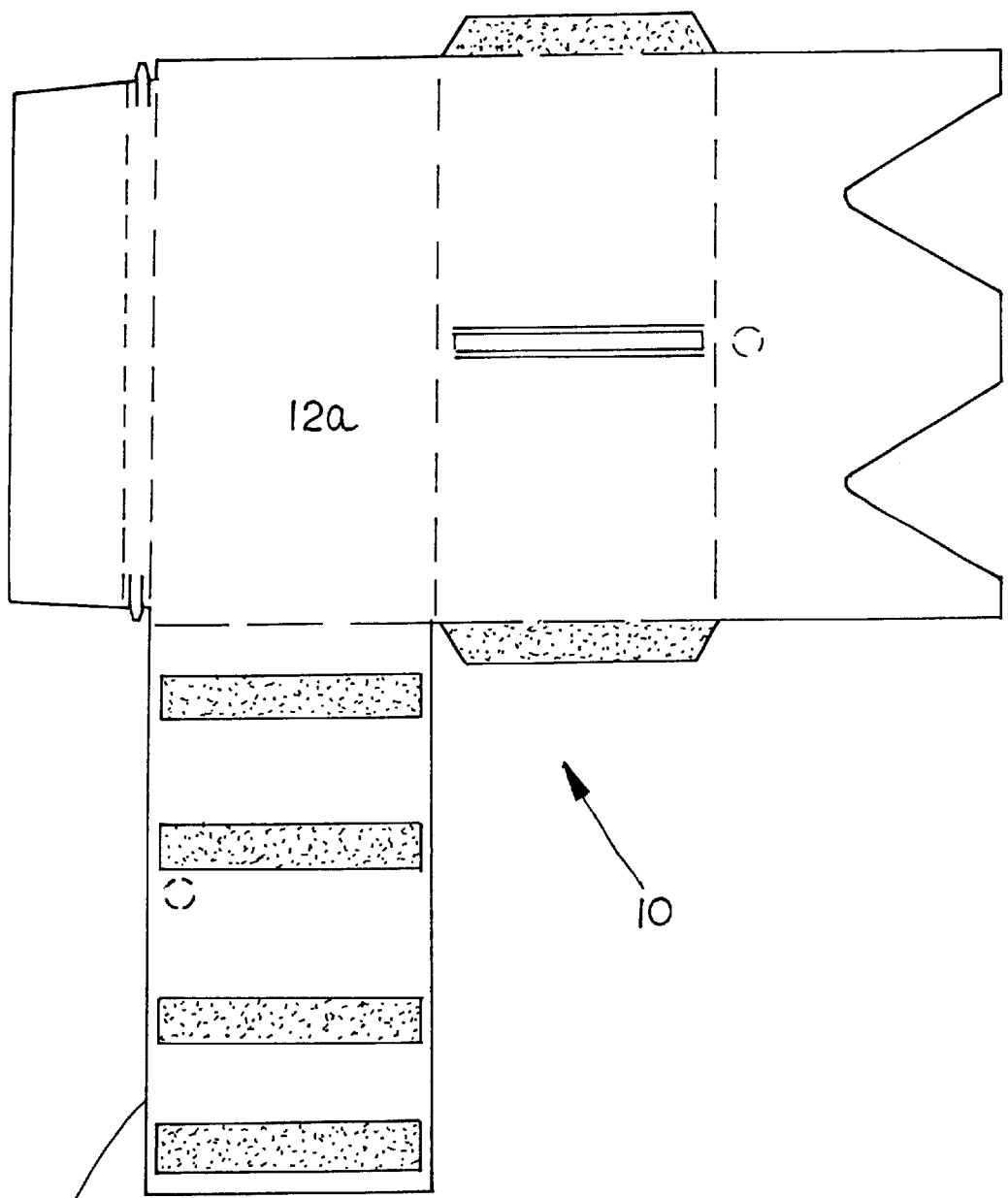
FIG. 3 is a top plan view similar to FIG. 1 but showing preferred dimensions for the unassembled book insert CD carrier device constructed in accordance with the teachings of a first preferred embodiment of the present invention and again showing the un-printed side (i.e., the non-glossy side) exposed.
Figure 4:
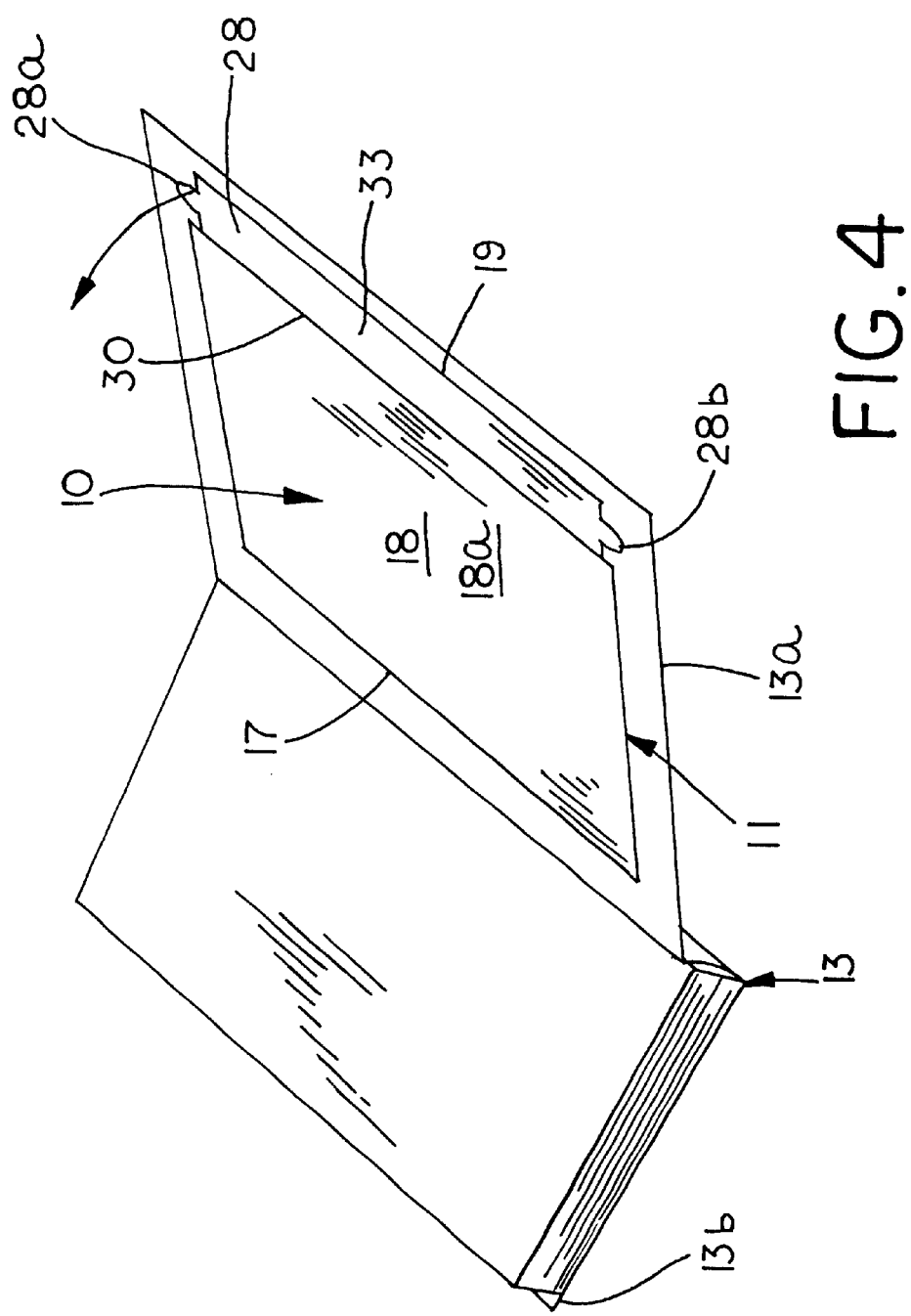
FIG. 4 is a perspective view an assembled book insert CD carrier device attached to the interior rear cover of a book.
Figure 5:
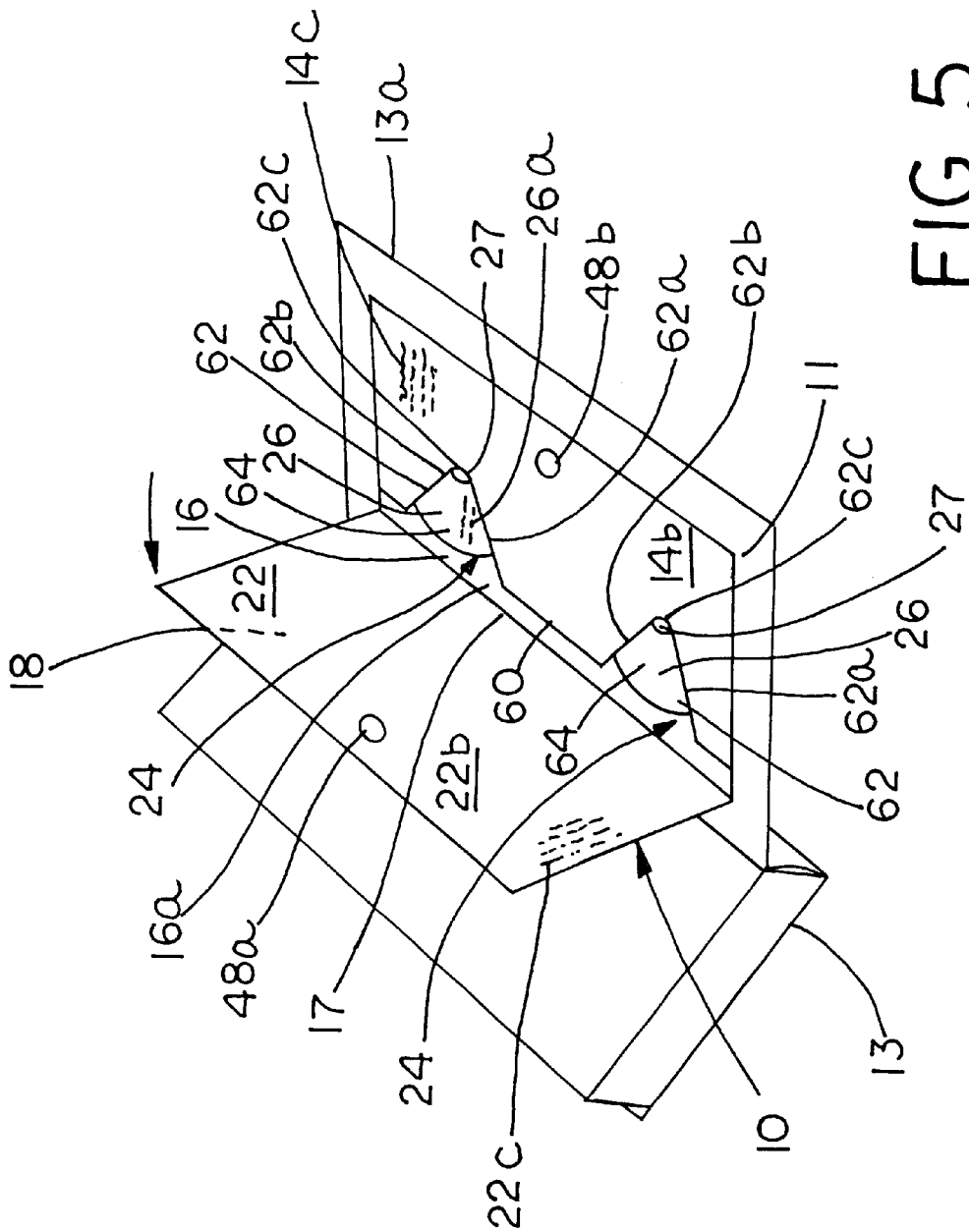
FIG. 5 is a perspective view of the book insert CD carrier device of FIG. 4 shown with the tear away strip removed to permit opening of the device in book form.

As shown in FIG. 1, each of the panels 14, 16, 18, 20 and 22 includes a non-glossy surface 14a, 16a, 18a, 20a, and 22a, respectively. As shown in FIG. 2, each of the panels 14, 16, 18, 20 and 22 includes a glossy surface 14b, 16b, 18b, 20b, and 22b, respectively. As shown in FIG. 5, at least the glossy surfaces 14b and 22b may include graphics 14c, 22c, respectively. Other of the glossy surfaces 16b, 18b and 22b may include graphics (not shown) as desired.

Figure 6:
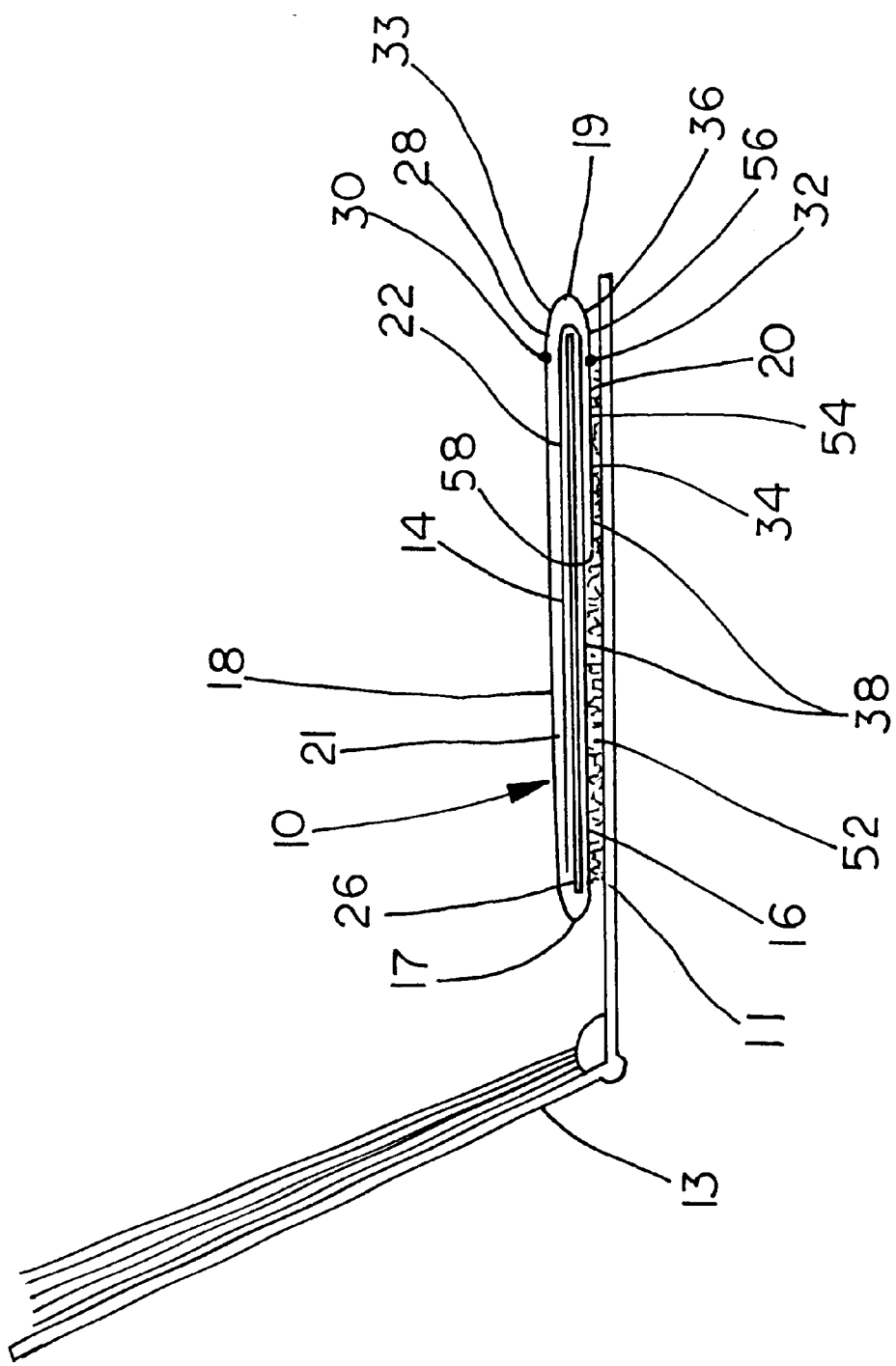
FIG. 6 is an enlarged cross-sectional view taken along line 6—6 of FIG. 5.

As shown in FIGS. 5 and 6, when the first panel 14 is folded along the first hinge line 15 to a position adjacent the second panel 16, one or more pockets 24 are formed therebetween. As shown in FIG. 5, the pockets 24 are sized to receive a CD 26. Also as shown in FIG. 5, in the preferred embodiment the pockets 24 are side loading (i.e., the pockets 24 load sideways in a direction generally perpendicular to a spine 13c of the book 13 rather than up or down in a direction generally parallel to the spine 13c). Other loading configurations, including up, down, or along a diagonal are possible. The CD or CD's 26 may include printed graphics 26a.

A tear away strip 28 is provided, with the tear away strip being bounded by a frangible connection 30 on the third panel 18 and by a frangible connection 32 on the fourth panel 20. Preferably, both the frangible connections 30 and 32 are formed by lines of perforations. Still preferably, the frangible connection 32 may be formed of a line of elongated slit perforations 32a. Other forms of frangible connections may be employed. The tear away strip 28 may be of the type commonly employed in shipping envelopes and the like. The third panel 18 includes a removable portion 33. The removable portion 33 is bounded by the frangible connection 30 on the third panel 18 and by the third hinge line 19. The fourth panel 20 includes a fixable portion 34 and a removable portion 36. The removable portion 36 of the fourth panel 20 is bounded by the hinge line 19 and the frangible connection 32. In the disclosed embodiment, the third hinge line 19 is not frangible, and thus upon removal of the tear away strip 28, the frangible connections 30 and 32 are separated from their adjacent panels 18, 20, respectively. Accordingly, the removable portion 36 of the panel 20 and the removable portion 33 of the panel 18 are removed.

The fixable portion 34 cooperates with a portion of the second panel to form a binding face 38 (viewable in FIG. 6). The binding face 38 may be positioned to be secured to the receiving area 11 of the book 13 as shown in FIG. 6. Thus, upon removal of the removable portion 36 of the panel 20 and the removable portion 33 of the panel 18, the fixable portion 34 of the panel 20 (along with the balance of the carrier device 10) remain secured to the book 13.

As shown in FIG. 1, the second panel 16 preferably includes a pair of side tabs 40, with each of the side tabs having an adhesive strip 42 (preferably a peel and seal adhesive strip of the type commonly employed in the printing and binding arts). Another adhesive strip 44 may also be provided, with the adhesive strip 44 extending across a width of the second panel 16 to form a divider 46 between the pockets 24. Also preferably, two portions 48a and 48b of a hook and loop closure may be provided to secure the device 10 closed upon removal of the tear away strip 28 (FIG. 5). In the disclosed embodiment, the portion 48a is disposed on the panel 22 (on the glossy surface 22b), while the portion 48b is disposed on the panel 14 (on the glossy surface 14a). The fifth panel 22 may also include one or more adhesive strips 50 (again, preferably peel and seal adhesive strips) in order to secure the fifth panel 22 to the third panel 18 upon folding of the fifth panel 22 along the fourth hinge line 21.

Viewing FIG. 6, once the carrier device 10 is assembled (following the steps outlined in FIGS. 7–9), the binding face 38 may be secured to the inside surface of the rear cover 12a of the book 13. Note that in the disclosed embodiment, the fixable portion 34 of the fourth panel 20 does not need to be secured to the second panel 16. In other words, when viewing FIG. 8, that portion of the non-glossy surface 20a disposed on the fixable panel 34 does not need to be glued or secured to the glossy surface 16b of the panel 16 after folding the carrier device 10 to the position of FIG. 9. Both the fixable portion 34 and the panel 16 (together forming the binding face 38, which is shown in cross-hatching in FIG. 9) are secured to the receiving area 11 of the book 13 using an adhesive 52 (FIG. 6) applied in a final assembly step.

Figure 9:
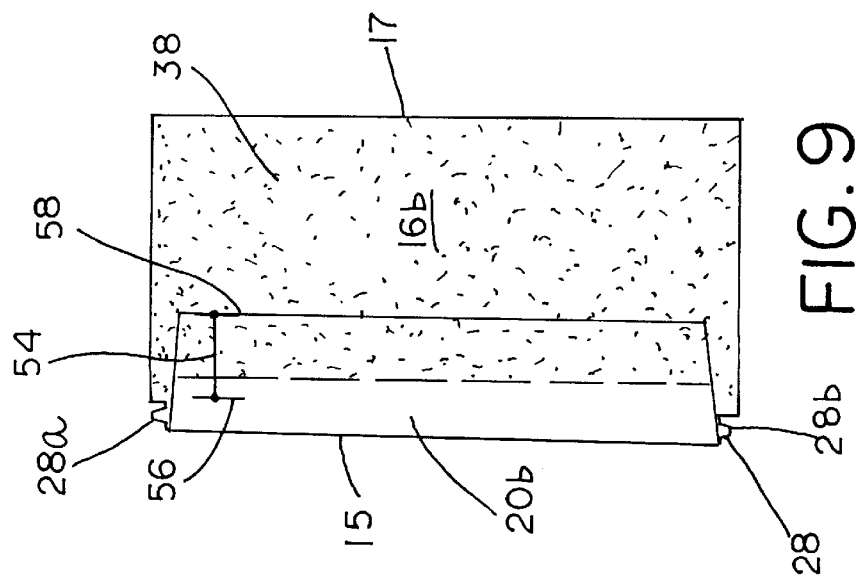
FIG. 9 is a plan view similar to FIGS. 6 and 7 but showing the carrier device in a fully folded position.

Referring to FIGS. 1, 6 and 9, a portion 54 of the panel 20 overlaps an adjacent portion of the panel 16, with the portion 54 being bounded by the points indicated by lines 56 and 58. It will be noted that according to the preferred embodiment of the invention, the portion 54 has a width that extends across the adjacent panel 16 a distance of at least twenty-five percent of the width of the panel 16.

As shown in FIGS. 1, 2 and 5, the panel 14 includes an edge 60 having one or more cutouts 62. Each cutout 62 includes a pair of edges 62a, 62b, which converge at a vertex 62c. The edges 62a, 62b and the vertex 62c are sized and located such that the cutouts 62 reveal a generally pie-shaped portion 64 of the CD 26 inserted in one or more of the pockets 24. Preferably, the cutouts 62 will extend to include an aperture 27 on each of the CDs 26. The vertex 62 of each cutout 62 may be located so as to reveal the central aperture on the CD or CDs 26. The graphics 14c on the surface 14b of the panel 14 may complement the graphics 26a printed on a face of the CD or CDs 26. Other forms of cutouts, pockets, receiving slots, etc. sufficient to hold the CDs in place may be used.

Referring now to FIGS. 1 and 7–9, one manner of assembling the carrier device 10 is as follows. The carrier device 10 may initially be disposed on the position of FIG. 1. The panels 22 and 14 are folded along their respective hinge lines 21 and 15 to the position of FIG. 7. Also, the side tabs 40 are folded inwardly from the position of FIG. 1 to the position of FIG. 7 in which the side tabs 40 overlap and engage the panel 14. The panel 22 is secured in place by the adhesive strips 50, while the panel 14 is secured in pace by the adhesive strips 42 on the side tabs 40, and by the adhesive strip 44 in the central portion of the panel 16.

Note that as alternatives the adhesive strips 50 may be disposed on the panel 18, while the adhesive strip 44 may be disposed in the panel 14. Further, the side tabs 40 may be formed on the panel 14. Also, the side tabs 40 may have the adhesive strips 42 on the opposite face from that shown such that the side tabs 40 would be disposed under the panel 14 when the panel 14 is positioned as shown in FIG. 7.

Figure 7:
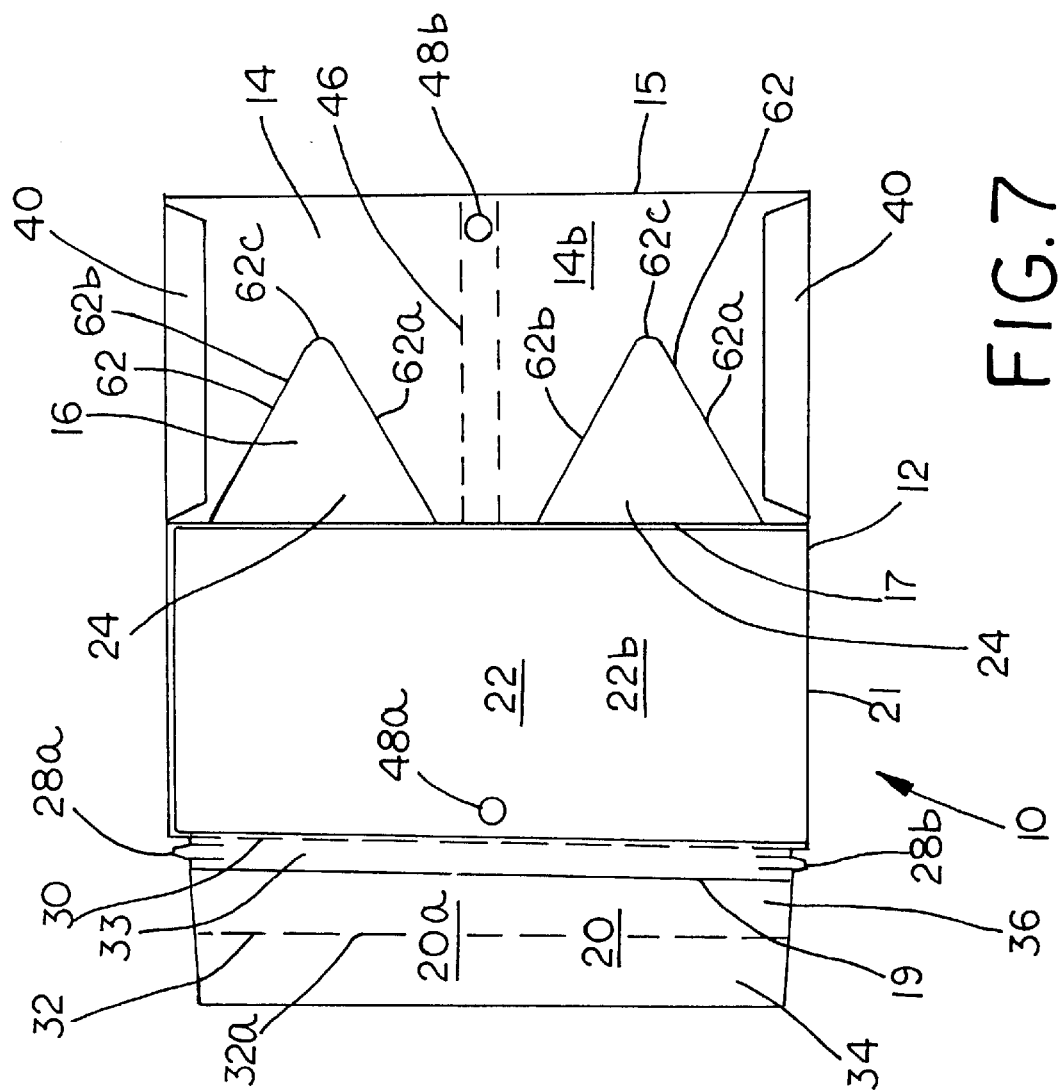
FIG. 7 is a plan view of the book insert CD carrier device in a partially folded position.
Figure 8:
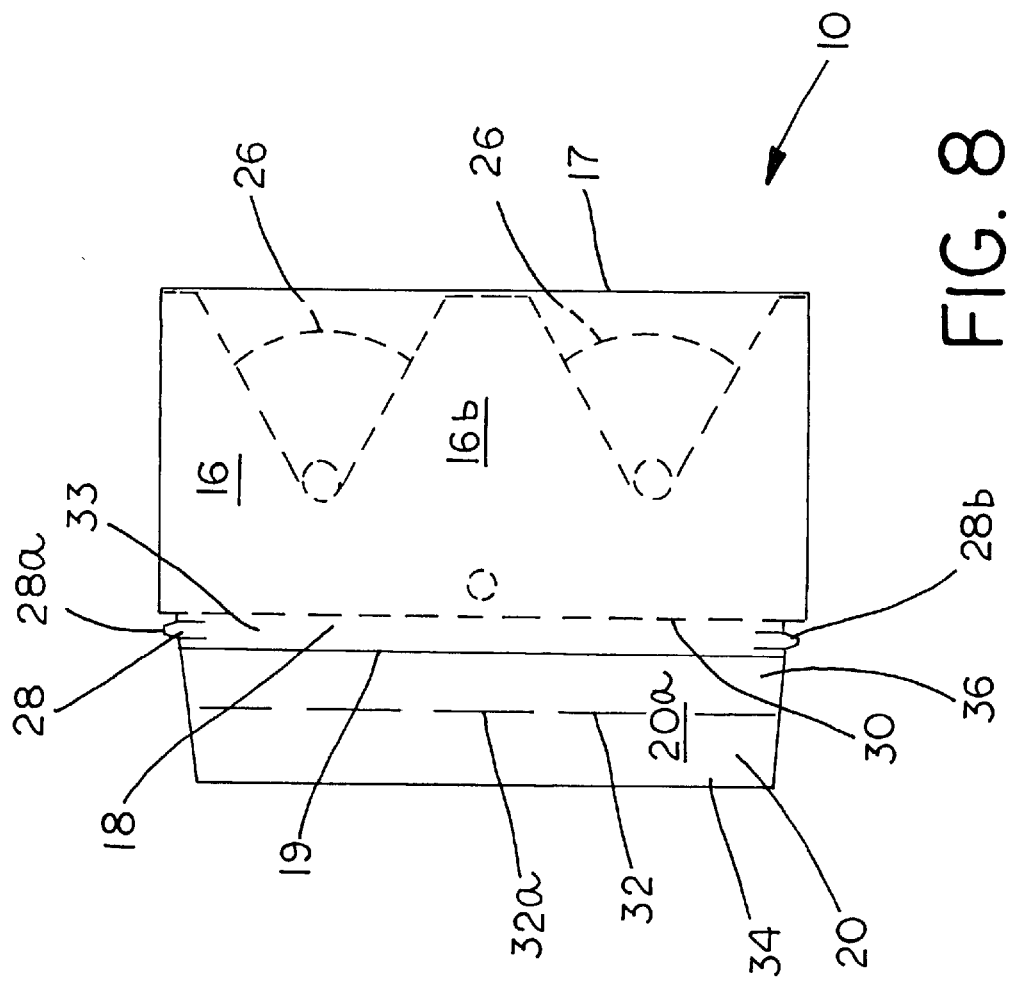
FIG. 8 is a plan view similar to FIG. 7 but showing the carrier device in another partially folded position.

Once the carrier device 10 is disposed in the position of FIG. 7, it will be noted that the pockets 24 are formed, with the pockets 24 being separated by the divider 46. A CD 26 may be loaded into one or both of the pockets 24 at this juncture. The panels 14, 16 are then folded as a unit along the hinge line 17, such that the panels 14, 16 are brought into confronting relationship with the panels 18 and 22 (e.g., the glossy surface of the panel 14 faces the glossy surface of the panel 22). The carrier device 10 is now disposed as shown in FIG. 8. Again it will be noted that in the outlined method of assembly the panel 20 does not need to be secured to the panel 16 (e.g., the non-glossy surface 20a of the panel 20 does not need to be secured to the glossy surface 16b of the panel 16), thus eliminating one assembly step. FIG. 9 illustrates the binding face 38 in cross-hatching. Note that the portion of the glossy surface 20b disposed on the removable portion 36 of the panel 20 does require adhesive and thus is not included in the binding face 38.

The next step in the outlined method of assembly is to fold the panel 20 along the hinge line 19. This brings the device into the configuration shown in FIG. 9. When viewing FIG. 9, it will be noted that the frangible connection 32 extends past the tear away strip 28 and the frangible connection 30.

When it is desired to secure the carrier device 10 in a book 13, the carrier device 10 is oriented as necessary to bring the binding face 38 into contact with the receiving area 11 of the book 13. When viewing FIGS. 9 and 10, this is accomplished by rotating the carrier device 10 about a vertical axis from the position of FIG. 9 (with the binding face 38 facing up from the plane of the Fig.) to the position of FIG. 10 (with the binding face 38 facing into the plane of the Fig.). The adhesive 52 may be applied, and the carrier device 10 may be secured to the book 13 using conventional assembly techniques.

Referring now to FIGS. 5 and 6, when a user (not shown) wishes to gain access to the CD or CDs 26 disposed in the pocket or pockets 24, the user may first position the book 13 as shown in FIG. 6. Note that the tear away strip 28 is still intact. The user grasps a pull tab 28a or 28b at either end of the tear away strip 28, and pulls on the tear away strip 28. This action severs the frangible connections 30 and 32. The removable portion 33 of the panel 18 and the removable portion 36 of the panel 20 are removed in this process. The fixable portion 34 (which forms a portion of the binding face 38) remains secured to the receiving area 11 of the book 13.

The user may then pivot the attached panels 18 and 22 in conjunction about the hinge line 17, which reveals the CD or CDs 26 disposed in the pocket or pockets 24. Upon gaining access, the carrier device 10 may again be closed by pivoting the attached panels 18 and 22 in conjunction about the hinge line 17 in the opposite direction, thus bringing the panels 18 and 22 into confronting relationship with the panels 14 and 16 (e.g., the glossy surface 22b faces the glossy surface 14b). The carrier device 10 may be secured on the closed position using the cooperating portions 48a and 48b of the hook and loop closure.

It will be understood to those having ordinary skill in the art that although the preferred embodiment uses peel and seal adhesive strips, any other adhesive may alternatively be used. For example, an adhesive that allows for easy removal of the CD carrier device 10 from the book may instead be desired. In addition, the hinge lines described herein may include any type of hinge line, including, for example, scored hinge lines or slitted hinge lines that lend flexibility to the hinge and thereby facilitate folding about the hinge line. Other suitable hinge lines may be used as well.

Moreover, although the preferred embodiment is sized to hold two standard sized CDs, the carrier device 10 may instead be configured and sized to hold fewer or more CDs and thus may include additional or fewer pockets. Lastly, although shown attached to the receiving area 11 of the book 13, the carrier device 10 may instead be attached to the exterior cover of the book 13, which may be hard cover or soft cover, or any other desired, similarly sized media.

Figure 10:
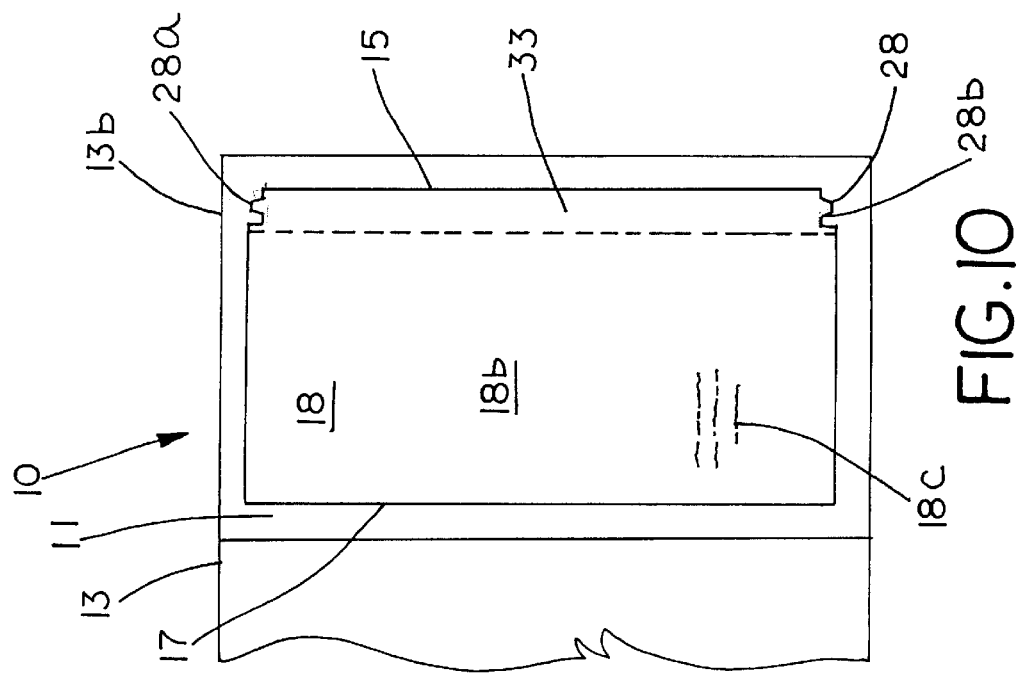
FIG. 10 is a plan view of the carrier device similar of FIG. 9 after rotating the carrier device about a vertical axis and showing the carrier device as it would appear upon when secured to the back cover of a book.

After the carrier device 10 has been assembled as outlined above, the glossy surface 12b is generally exposed. As is known in the printing arts, a glossy surface is generally more suitable for receiving printed graphics in the form of text, pictures, graphics, symbols, or any other desired artistic representations. Thus, the majority of the exposed surface of the carrier device 10 may include such printed graphics. As outlined above, when the carrier device 10 has been opened and is in use as shown in FIG. 5, the graphics 14c and 22c on the panels 14 and 22, respectively, are visible to the user. In contrast, the bulk of the non-glossy surface 12a is not exposed as it may form the interior surface of the carrier device 10, or it may form an insignificant portion of the exposed surface. When the carrier device 10 is positioned as shown in FIG. 5, the user may be presented with an array of printed graphics, as the glossy surface 22b of the panel 22 and the glossy surface 14b of the panel 14 are both exposed. Further, when the device is positioned as shown in FIG. 10, the user may be presented with graphics 18c printed on the glossy surface 18b of the panel 18.

In accordance with the present invention, a carrier device which may be used as a book insert has been provided. By reason of the present invention, a book vendor may be provided with a carrier device for packaging a book in conjunction with one or more CDs as a single unit, thereby facilitating the unitary sale of two different information presentation formats in a single product.

Thus, a CD carrier device according to the preferred embodiment provides a carrier device that is suitable for carrying CDs or similarly shaped objects and which may be readily attached to the front or rear covers of a book or any other suitable structure.

Further, it will be understood that when fully assembled, the present carrier device 10 presents a tamper evident structure. That is, the CD or CDs cannot be removed or tampered with without first removing the tear away strip 28 as detailed above. Thus, a vendor, a purchaser, or a user can be immediately whether the carrier device 10 has been tampered with simply by viewing the state of the tear away strip 28.

Although certain exemplary embodiments constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A CD carrier for insertion into a book, the CD carrier comprising:
    a single paperboard sheet, the sheet having a first face and a second face, the sheet further including a plurality of hinge lines dividing the sheet into a plurality of panels, each of the panels having first and second faces corresponding to the first and second faces of the sheet, and wherein:
        a first panel and a second panel are separated by a first hinge line, the first panel being foldable along the first hinge line to a folded position adjacent the second panel to form a pocket therebetween, the pocket being sized to receive a CD therein;
        a third panel separated from the second panel by a second hinge line;
        a fourth panel separated from the third panel by a third hinge line, the first, second and third hinge lines being generally parallel to each other;
        a fifth panel separated from the third panel by a fourth hinge line, the fourth hinge line being perpendicular to the first, second and third hinge lines; and
        a tear away strip, the tear away strip defined in part by cooperating frangible connections on each of the third and fourth panels;
    whereby the CD carrier is formed by folding the first panel along the first hinge line to create the pocket, folding the fifth panel along the fourth hinge line thereby positioning the second face of the first panel side by side with the second face of the fifth panel, folding the first and second panels together along the second hinge line until the second face of the first panel is in confronting relationship with the second face of the fifth panel, and then folding the fourth panel along the third hinge line so that an overlapping edge portion of the fourth panel overlaps the second panel but is unsecured to the second panel, and wherein cooperating portions of the fourth panel and the second panel form a binding face adapted to permit adhesive securement of the CD carrier to the book.

2. The CD carrier of claim 1, wherein the fourth panel is sized so that the overlapping edge portion extends at least twenty five percent across a width of the second panel.

3. The CD carrier of claim 1, wherein the frangible connection of the fourth panel divides the fourth panel into a fixable section and a removable section, the fixable section forming a portion of the binding face, and wherein the fixable section is at least as wide as the removable section.

4. The CD carrier of claim 1, in combination with the book, the book including a CD carrier receiving area, the binding face being adhesively secured to the CD carrier receiving area, and wherein upon removal of the tear away strip the CD carrier is openable in book form along the second hinge line.

5. The CD carrier of claim 1, wherein at least one of the first panel and the second panel includes a pair of tabs, each of the tabs being foldable along a tab hinge line to a folded position, each of the tabs having an adhesion surface to permit adhesive securement of the first panel to the second panel when the first and second panels are in the folded position.

6. The CD carrier of claim 1, wherein at least one of the first panel and the second panel includes at least one tab, the tab foldable along a tab hinge line to a folded position, the tab including an adhesion surface so that the first panel and the second panel may be secured to each other when the first and second panels are in the folded position.

7. The CD carrier according to claim 6, wherein the adhesion surface of each of the tabs comprises a peel and seal adhesive strip.

8. The CD carrier of claim 1, wherein the second face of each of the panels is constructed of a material adapted to receive printed matter thereon.

9. The CD carrier of claim 1, wherein the first panel includes a side edge, the side edge including a cutout extending from the side edge of the first panel toward a central portion of the first panel, the cutout being sized to reveal a pie-shaped portion of a CD disposed in the pocket, the pie-shaped portion extending about to a central aperture of the CD.

10. The CD carrier of claim 1, including a divider dividing the pocket into a pair of compartments.

11. The CD carrier of claim 10, wherein the divider comprises an adhesive strip extending generally across a width of at least one of the first and second panels.

12. The CD carrier of claim 1, wherein the fourth panel includes a separable portion and a fixable portion, the separable portion and the fixable portion separated by the frangible connection of the fourth panel.

13. The CD carrier of claim 12, wherein the third panel includes a separable portion, the separable portion of the third panel bounded by the frangible connection of the third panel, the separable portion of the third panel connected to the separable portion of the fourth panel by the third hinge line, the separable portion of each of the third and fourth panels being removable upon the forcible removal of the tear away strip.

14. The CD carrier of claim 12, wherein the fourth panel includes an exposed portion and a covered portion, the covered portion covered by at least the fixable portion of the fourth panel, and wherein the bindable face comprises the fixable portion of the fourth panel and the exposed portion of the second panel, and including an adhesive for securing the fixable portion of the fourth panel and the exposed portion of the second panel to the book.

15. The CD carrier according to claim 14, wherein the adhesive comprises a peel and seal adhesive strip.

16. The CD carrier of claim 15, including a fifth panel foldable along a fourth hinge line to a position overlying the third panel, the fifth panel disposed between the pocket section and the third panel when the pocket section is folded along the second hinge line, and wherein each of the panels the sheet includes a first face and a printable second face, and wherein the second face of the first panel and the second face of the fifth panel are positioned side by side when the fifth panel is folded along the fourth hinge line and the pocket section is unfolded along the second hinge line.

17. The CD carrier of claim 1, including an adhesive for securing the bindable face to the book.

18. The CD carrier of claim 17, wherein the adhesive comprises a plurality of adhesive strips.

19. A CD carrier for insertion into a book, the CD carrier comprising:
   a single paperboard sheet, the sheet further including a plurality of hinge lines dividing the sheet into a plurality of panels, and further including:
      a first panel and a second panel, at least one of the panels being foldable along a first hinge line to a folded position confronting the other panel, the first and second panels forming a pocket section having a pocket sized to receive at least one CD therein;
      a third panel separated from the pocket section along a second hinge line;
      a fourth panel separated from the third panel by a third hinge line;
      a fifth panel foldable along a fourth hinge line;
      a tear away strip, the tear away strip defined in part by cooperating frangible connections on each of the third and fourth panels;
      whereby the CD carrier is converted to a folded position upon folding the fifth panel along the fourth hinge line to a position overlying the third panel, folding the pocket section along the second hinge line thereby positioning the fifth panel between the third panel and the pocket, and folding the fourth panel along the third hinge line thereby positioning the pocket between the fifth panel and the fourth panel, the fourth panel being unsecured to the second panel, the second and fourth panels cooperating to form a binding face suitable for adhesively securing the CD carrier into the book.

20. The CD carrier of claim 19, wherein the fourth panel is sized so that an overlapping edge portion of the fourth panel extends at least twenty five percent across a width of the second panel.

21. The CD carrier of claim 20, wherein the divider comprises an peel and seal strip extending generally across a width of at least one of the first panel and the second panel.

22. The CD carrier of claim 19, wherein the frangible connection of the fourth panel divides the fourth panel into a fixable section and a removable section, the fixable section forming a portion of the binding face, and wherein the fixable section is at least as wide as the removable section.

23. The CD carrier of claim 19, in combination with the book, the book including a CD carrier receiving area, the binding face being adhesively secured to the CD carrier receiving area, and wherein upon removal of the tear away the CD carrier is openable in book form along the second hinge line.

24. The CD carrier of claim 23, including a closure mechanism for securing the CD carrier in the folded position after removal of the tear away strip.

25. The CD carrier of claim 24, wherein the closure mechanism comprises a hook and loop closure.

26. The CD carrier of claim 19, wherein at least one of the first panel and the second panel includes at least one tab, the tab being foldable along a tab hinge line to a folded position, the tab having an adhesion surface to permit adhesive securement of the first panel and the second panel in the folded position.

27. The CD carrier of claim 26, including a peel and seal strip engaging the tab.

28. The CD carrier of claim 19, including a divider dividing the pocket section into a pair of compartments, each of the compartments being sized to receive a CD.

29. The CD carrier of claim 19, wherein the fourth panel includes a separable portion and a fixable portion, the separable portion and the fixable portion separated by the frangible connection of the fourth panel, the fixable portion of the fourth panel a portion of the binding face, and wherein the third panel includes a separable portion, the separable portion of the third panel bounded by the frangible connection of the third panel, the separable portion of the third panel connected to the separable portion of the fourth panel by the third hinge line, the separable portion of each of the third and fourth panels being removable upon the forcible removal of the tear away strip, thereby permitting the CD carrier to be opened in book form.

30. The CD carrier of claim 19, wherein the first panel includes a side edge, the side edge including a cutout having a pair of edges extending to a vertex, the vertex being positioned to generally correspond to a central aperture of a CD disposed in the pocket section, the cutout further revealing a pie-shaped portion of the CD disposed in the pocket.

31. A CD carrier for insertion into a book, the CD carrier comprising:
   a single paperboard sheet, the sheet further including a plurality of hinge lines dividing the sheet into a plurality of panels, and further including:
      a first panel and a second panel, at least one of the panels being foldable along a first hinge line to a folded position confronting the other panel, the first and second panels forming a pocket section having a pocket sized to receive at least one CD therein, at least one of the first panel and the second panel including at least one tab, the tab being foldable along a tab hinge line to a folded position and engaging an adhesive strip to permit securement of the first panel and the second panel in the folded position.
      a third panel separated from the pocket section along a second hinge line;
      a fourth panel separated from the third panel by a third hinge line;
      a fifth panel foldable along a fourth hinge line to a position overlying the third panel, the fifth panel disposed between the pocket section and the third panel when the pocket section is folded along the second hinge line
      a tear away strip, the tear away strip defined in part by cooperating frangible connections on each of the third and fourth panels:
      whereby the CD carrier is formed by folding the fifth panel along the fourth hinge line and folding the pocket section along the second hinge line so that a printed face of the first panel and a printed face of the fifth panel are in confronting relationship, and by folding the fourth panel along the third hinge line thereby positioning the pocket section between the fifth panel and a portion the fourth panel, with the second and fourth panels cooperating to form a binding face suitable for adhesively securing the CD carrier into the book.

* * * * *

UNITED STATES PATENT AND TRADEMARK OFFICE
CERTIFICATE OF CORRECTION

PATENT NO. : 6,648,136 B2 Page 1 of 1
DATED : November 18, 2003
INVENTOR(S) : Annalee Koehn It is certified that error appears in the above-identified patent and that said Letters Patent is hereby corrected as shown below:

Column 10,
Line 43, please delete "position." and insert instead -- position; --
Line 52, please delete "line" and insert instead -- line; --.
Line 55, please delete "panels:" and insert instead -- panels; --.

Signed and Sealed this

Ninth Day of November, 2004

JON W. DUDAS
*Director of the United States Patent and Trademark Office*